United States Patent
Hoshi et al.

(10) Patent No.: US 7,147,700 B2
(45) Date of Patent: Dec. 12, 2006

(54) WATER BASE INK FOR INK-JET RECORDING

(75) Inventors: Tatsunosuke Hoshi, Nagoya (JP); Masaya Fujioka, Nagoya (JP); Hideo Ohira, Tajimi (JP); Yoshito Toyoda, Nagoya (JP); Narumi Koga, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 135 days.

(21) Appl. No.: 10/746,429

(22) Filed: Dec. 24, 2003

(65) Prior Publication Data

US 2004/0226477 A1    Nov. 18, 2004

(30) Foreign Application Priority Data

Dec. 27, 2002   (JP) ............................. 2002-379952

(51) Int. Cl.
   *C09D 11/02*   (2006.01)

(52) U.S. Cl. .................................. 106/31.89

(58) Field of Classification Search .............. 106/31.89
   See application file for complete search history.

(56) References Cited

U.S. PATENT DOCUMENTS

| | | | | |
|---|---|---|---|---|
| 5,762,695 A * | 6/1998 | Wong et al. | ............. | 106/31.89 |
| 5,954,866 A * | 9/1999 | Ohta et al. | ................ | 106/31.89 |
| 6,036,759 A * | 3/2000 | Wickramanayake et al. | ........................ | 106/31.28 |
| 6,488,753 B1 * | 12/2002 | Ito et al. | ..................... | 106/31.9 |
| 6,676,736 B1 * | 1/2004 | Nakano et al. | .......... | 106/31.58 |
| 6,730,155 B1 * | 5/2004 | Gotoh et al. | ............. | 106/31.86 |
| 6,746,527 B1 * | 6/2004 | McElligott et al. | ....... | 106/31.65 |
| 6,749,675 B1 * | 6/2004 | Momose | .................. | 106/31.58 |
| 6,899,751 B1 * | 5/2005 | Arita et al. | ............... | 106/31.27 |
| 2003/0196568 A1 * | 10/2003 | Miyamoto et al. | ....... | 106/31.58 |
| 2004/0080595 A1 * | 4/2004 | Taguchi et al. | ............. | 347/100 |

FOREIGN PATENT DOCUMENTS

| JP | 2696992 | 9/1997 |
|---|---|---|
| JP | 2002-225286 | 8/2002 |

* cited by examiner

*Primary Examiner*—J. A. Lorengo
*Assistant Examiner*—Veronica F. Faison
(74) *Attorney, Agent, or Firm*—Reed Smith LLP

(57) ABSTRACT

A water base ink for ink-jet recording comprises water, self-dispersing type carbon black, an anionic surfactant, and a nonionic surfactant. The anionic surfactant is a surfactant represented by the formula (1) and/or a surfactant represented by the formula (2). The nonionic surfactant is a surfactant represented by the formula (3) or a mixture of a surfactant represented by the formula (4) and a surfactant represented by the formula (5). No ink discharge failure occurs, the long term stability is excellent, and it is possible to obtain a high quality image without any feathering.

15 Claims, No Drawings

WATER BASE INK FOR INK-JET RECORDING

BACKGROUND OF THE INVENTION

1. Field of the Invention

The present invention relates to a water base ink for ink-jet recording to be used for an ink-jet recording apparatus.

2. Description of the Related Art

In the ink-jet recording system, ink droplets are formed, for example, by means of the electrostatic attraction system, the system in which mechanical vibration or displacement is applied to the ink by using a piezoelectric element, and the system in which bubbles are generated by heating the ink to utilize the pressure generated thereby. All or a part of the ink droplets are adhered to a recording objective material such as paper to perform the recording.

In the ink-jet recording system as described above, the ink droplets are intermittently discharged at a high speed by repeating the drastic or abrupt compression of the ink in the minute structure. Therefore, the cavitation tends to occur. As a result, the dissolved gas, which has been dissolved in the ink, remains as bubbles in the ink flow passage in some cases. If the ink flow passage is contaminated with the bubbles, the following problem arises. That is, the transmission of the pressure is inhibited by the bubbles, and it is impossible to discharge the ink stably.

Those known as the water base ink for ink-jet recording to be used for the ink-jet recording system include those obtained by dissolving or dispersing water-soluble dyes or water-insoluble coloring agents in liquid media composed of water and water-soluble organic solvents. Recently, the high quality level is required for all of the qualities including, for example, the printing quality, the weather resistance, the long term stability, and the discharge performance. The attention is directed to the self-dispersing carbon black which is extremely superior in weather resistance and which is excellent in the printing quality and the long term stability.

However, the ink, which is based on the use of the self-dispersing type carbon black, is apt to cause the problem of ink discharge failure, because the minute bubbles, which are adhered to the surface of the porous carbon black, prompt the generation of the bubbles on account of the cavitation. Further, the carbon black particles cause a large flow resistance in the minute ink flow passage, and the pressure loss is increased when the ink is subjected to the purge operation. Therefore, a problem arises such that the normal state is not restored when the discharge failure arises.

The following method is widely utilized in order to solve the problem of the ink discharge failure as described above. That is, the ink flow passage is prevented from the adhesion of the bubbles by adding a surfactant or the like to improve the wettability of the interior of the ink flow passage so that the generated bubbles are discharged with ease. However, this method has involved the following problem. That is, the wettability on the recording paper is simultaneously enhanced, and the contour of the image area is blurred to cause the feathering. It is noted that the feathering resides in the following phenomenon. That is, when the printing is performed on the regular paper which is not surface-coated, then the ink is permeated along paper fibers existing in an irregular form, and an image, which is fuzzy and indistinct, is formed. In general, the feathering tends to occur when the wettability of the ink with respect to the paper surface is more increased. The feathering is the great hindrance when it is intended to perform the high quality printing. On the other hand, if the amount of addition of the surfactant is suppressed in order to avoid the feathering, the ink discharge failure consequently takes place, because the wettability of the ink with respect to the ink flow passage is insufficient.

The generation of the bubbles and the growth of the generated bubbles can be inhibited by decreasing the amount of the dissolved gas in the ink. Therefore, a method is widely utilized, in which a degassing step is added after the production of the ink. Japanese Patent No. 2696992 discloses an example in which the dissolved gas is removed by effecting the heating at 70° C. for 160 hours. However, in the case of this method, when a long period of time elapses after the degassing, the degassed state of the ink is extinguished due to the contact with the air. Therefore, a problem arises in relation to the long term stability of the ink.

SUMMARY OF THE INVENTION

The present invention has been made in order to solve the problems as described above, an object of which is to provide a water base ink for ink-jet recording which involves no problem concerning the ink discharge failure, which is excellent in long term stability, and which makes it possible to obtain a high quality image without any feathering even when the printing is performed on the regular paper.

According to the present invention, there is provided a water base ink for ink-jet recording comprising:
water;
self-dispersing type carbon black;
at least one anionic surfactant which is selected from a surfactant represented by the following formula (1) and a surfactant represented by the following formula (2); and
at least one nonionic surfactant which is selected from a surfactant represented by the following formula (3) and a mixed surfactant containing a surfactant represented by the following formula (4) and a surfactant represented by the following formula (5).

$$R^1-O(CH_2CH_2O)_x-SO_3M \quad (1)$$

In the formula (1), $R^1$ represents an alkyl group having carbon atoms of a number of 12 to 15, X is 0 to 4, and M represents Na or organic amine, preferably triethanolamine.

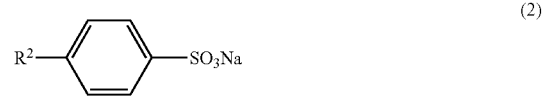

In the formula (2), $R^2$ represents an alkyl group having carbon atoms of a number of 12.

In the formula (3), each of $R^3$ to $R^8$ represents hydrogen or an alkyl group of C=18, and a+b+c+d+e+f represents an integer of 30 to 80. Preferably, at least four of $R^3$ to $R^8$ are alkyl groups of C=18, and the remaining two are hydrogens.

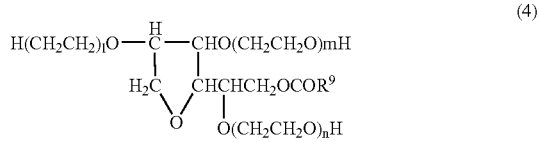
(4)

In the formula (4), $R^9$ represents an alkyl group having carbon atoms of a number of 16 to 18, l+m+n=5 to 30 is satisfied, preferably l+m+n=10 to 30 is satisfied, and especially preferably l+m+n=20 is satisfied.

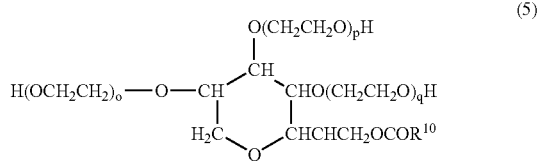
(5)

In the formula (5), $R^{10}$ represents an alkyl group having carbon atoms of a number of 16 to 18, o+p+q=5 to 30 is satisfied, preferably o+p+q=10 to 30 is satisfied, and especially preferably o+p+q=20 is satisfied.

In the ink of the present invention, it is preferable that a total content of the anionic surfactant and the nonionic surfactant in the ink is 0.1 to 0.5% by weight.

It is preferable that a mixing ratio of the surfactant represented by the formula (4) and the surfactant represented by the formula (5) is 1:3, and $R^9$ equals $R^{10}$.

According to the present invention, there is provided an ink cartridge comprising the water base ink for ink-jet recording of the present invention. The ink cartridge may be a cartridge to which a head of an ink-jet printer is installed, or a cartridge which is installed to a main body, for example, a case of an ink-jet printer.

DESCRIPTION OF THE PREFERRED EMBODIMENTS.

The water base ink for ink-jet recording of the present invention contains the anionic surfactant or surfactants represented by the formula (1) and/or the formula (2).

The surfactant represented by the formula (1) is the anionic surfactant composed of polyoxyethylene alkyl ether sulfate salt, which has a sulfonic acid group as a hydrophilic group. The surfactant represented by the formula (1) may include, for example, EMAL 20C ($R^1$: lauryl group, number of moles of ethylene oxide addition X=3, M=Na, produced by Kao Corporation), EMAL 20T ($R^1$: lauryl group, X=3, M=TEA, produced by Kao Corporation), SANDED END ($R^1$: alkyl group having a number of carbon atoms of 12 to 15, X=3, M=Na, produced by Sanyo Chemical Industries, Ltd.), SANDED ET ($R^1$: lauryl group, X=4, M=triethanolamine (TEA), produced by Sanyo Chemical Industries, Ltd.), and SUNNOL LM-1130 ($R^1$: alkyl group having a number of carbon atoms of 12 to 15, X=0, M=Na, produced by Lion Corporation).

The surfactant represented by the formula (2) is the anionic surfactant composed of alkylbenzene sulfonate salt, which has a sulfonic acid group as a hydrophilic group. The surfactant represented by the formula (2) may include, for example, NEOPELEX G25 ($R^2$: lauryl group (dodecyl group), M=Na, produced by Kao Corporation) and RUNOX S-100 ($R^2$: lauryl group (dodecyl group), M=Na, produced by Toho Chemical Industry Co., Ltd.).

In the water base ink for ink-jet recording of the present invention, the self-dispersing type carbon black and the anionic surfactant or surfactants represented by the formula (1) and/or the formula (2) are used in combination. Accordingly, it is possible to avoid the ink discharge failure which would be otherwise caused by the contamination with the bubbles in the ink flow passage, probably for the following reason. That is, it is considered that the anionic surfactant or surfactants represented by the formula (1) and/or the formula (2) have the sulfonic acid group having the strong polarity. Therefore, the electric repulsion is caused between the anionic surfactant and the self-dispersing type carbon black which is stabilized by the electrostatic repulsive force of the anion. As a result, the amount of the anionic surfactant existing in the vicinity of the carbon black is decreased.

The water base ink for ink-jet recording of the present invention contains at least one nonionic surfactant selected from the group consisting of the surfactant represented by the formula (3) and the mixed surfactant containing the surfactants represented by the formulas (4) and (5). The nonionic surfactant represented by the formula (3) is polyoxyethylene sorbitol fatty acid ester. Each of the nonionic surfactants represented by the formulas (4) and (5) is polyoxyethylene sorbitan fatty acid ester. Sorbitol is a sugar alcohol represented by $C_6H_{14}O_6$. Sorbitan is a compound which can be synthesized by intermolecular dehydration of sorbitol. Polyoxyethylene sorbitol fatty acid ester and polyoxyethylene sorbitan fatty acid ester are compounds obtained by adding ethylene oxide to sorbitan and sorbitol followed by esterification with fatty acid.

The nonionic surfactant represented by the formula (3) may include, for example, RHEODOL 460 (four of alkyl groups ($R^3$ to $R^8$) are oleyl groups and remaining two are hydrogens, number of moles of ethylene oxide addition: a+b+c+d+e+f=60, produced by Kao Corporation), RHEODOL 440 (four of $R^3$ to $R^8$ are oleyl groups and remaining two are hydrogens, a+b+c+d+e+f=40, produced by Kao Corporation), and SOLVON TR-843 (four of $R^3$ to $R^8$ are oleyl groups and remaining two are hydrogens, a+b+c+d+e+f=30, produced by Toho Chemical Industry Co., Ltd.).

The nonionic surfactant, in which the surfactants represented by the formulas (4) and (5) are mixed with each other, may include, for example, RHEODOL SUPER TW-O120 ($R^9=R^{10}$: oleyl group (C=18), l+m+n=o+p+q=20, produced by Kao Corporation) and SOLVON T-40 ($R^9=R^{10}$: palmityl group (C=16), l+m+n=o+p+q=20, produced by Toho Chemical Industry Co., Ltd.). The mixing ratio of the surfactants represented by the formulas (4) and (5) is 1:3 in each of RHEODOL SUPER TW-O120 and SOLVON T-40.

In the water base ink for ink-jet recording of the present invention, the self-dispersing type carbon black and at least one nonionic surfactant selected from the group consisting of the surfactant represented by the formula (3) and the mixture of the surfactants represented by the formulas (4) and (5) are used in combination. Accordingly, it is possible to avoid the ink discharge failure, probably for the following reason. That is, it is considered that the aggregation of minute bubbles is avoided by the nonionic surfactant which covers the surface of carbon black.

The total amount of the contents of the anionic surfactant and the nonionic surfactant is 0.1 to 0.5% by weight. If the total amount is less than 0.1% by weight, then the wettability in the ink flow passage is insufficient, and the ink discharge failure occurs. If the total amount exceeds 0.5% by weight, the feathering occurs. The total amount is preferably 0.2 to 0.4% by weight. However, the content ratio of the nonionic surfactant with respect to the anionic surfactant is preferably 1:9 to 9:1 and more preferably 1:3 to 3:1.

The water base ink for ink-jet recording of the present invention contains the self-dispersing type carbon black. The self-dispersing type carbon black is obtained by applying a surface treatment to water-insoluble carbon black in order to add the self-dispersing property. It is preferable that the content of the self-dispersing type carbon black is 0.1 to 20% by weight with respect to the total amount of the water base ink for ink-jet recording of the present invention. If the content is less than 0.1% by weight, any sufficient printing density is not obtained in some cases. If the content exceeds 20% by weight, it is impossible to retain the dispersion stability in some cases. The content is more preferably 0.3 to 15% by weight and much more preferably 0.5 to 10% by weight.

The water base ink for ink-jet recording of the present invention contains water. The water may be ordinary water. However, those having high purities including, for example, ion exchange water and distilled water are preferably used. The content of the water is preferably 10 to 98% by weight, more preferably 30 to 97% by weight, and much more preferably 35 to 90% by weight with respect to the total amount of the water base ink for ink-jet recording of the present invention.

The water base ink for ink-jet recording of the present invention is basically constructed as described above. However, if necessary, it is possible to add other conventionally known substances to improve the liquid stability, including, for example, dispersing agents, permeating agents, viscosity-adjusting agents, surface tension-adjusting agents, pH-adjusting agents, and antiseptic/fungicidal agents. The liquid stability described above refers to the presence of the (moistening) effect to avoid the drying of the water base ink for ink-jet recording at the nozzle of the recording head of the ink-jet printer.

The substance to improve the liquid stability is not specifically limited, which may include, for example, polyvalent alcohols such as ethylene glycol, diethylene glycol, triethylene glycol, polyethylene glycol, 1,3-butanediol, 1,5-pentanediol, 1,6-hexanediol, glycerol, 1,2,6-hexanetriol, 1,2,4-butanetriol, and 1,2,3-butanetriol; nitrogen-containing heterocyclic compounds such as N-methyl-2-pyrrolidone, N-hydroxyethyl-2-pyrrolidone, 2-pyrrolidone, 1,3-dimethylimidazolidinone, and $\epsilon$-caprolactam; amides such as formamide, N-methylformamide and N,N-dimethylformamide; amines such as monoethanolamine, diethanolamine, triethanolamine, monoethylamine, diethylamine, and triethylamine; and sulfur-containing compounds such as dimethylsulfoxide, sulfolane, and thiodiethanol. The substance to improve the liquid stability as described above may be used singly. Alternatively, two or more of the substances to improve the liquid stability as described above may be used in combination. The content of the substance to improve the liquid stability as described above is determined within a wide range depending on the composition and the desired characteristics of the water base ink for ink-jet recording of the present invention. However, it is preferable that the content is not more than 40% by weight. More preferably, the content is 2 to 30% by weight.

When the water base ink for ink-jet recording of the present invention is applied to the ink-jet recording system in which the ink is discharged in accordance with the action of thermal energy, thermal physical values including, for example, the specific heat, the coefficient of thermal expansion, and the coefficient of thermal conductivity may be adjusted.

The water base ink for ink-jet recording of the present invention is extremely excellent in discharge performance owing to the anionic surfactant and the nonionic surfactant contained therein. That is, when the two type of the surfactants as described above are simultaneously used, the anionic surfactant cannot approach the carbon black particles owing to the influence exerted by the nonionic surfactant. Therefore, the efficiency to wet the ink flow passage is improved. Simultaneously, the ratio of the nonionic surfactant existing in bulk is decreased. Therefore, it is possible to efficiently cover the surfaces of the carbon black particles. As a result of the synergistic effect exerted by the two types of the surfactants as described above, it is possible to obtain the water base ink for ink-jet recording which is excellent in discharge performance by adding the small amounts of the anionic surfactant and the nonionic surfactant in such a degree that no feathering is caused.

The present invention will be explained in more detail below as exemplified by Examples. However, the present invention is not limited to only Examples. Ink compositions according to the present invention are shown as Examples below. The numerical values are represented by % by weight.

EXAMPLE 1

A water base ink for ink-jet recording having a composition shown in Table 1 was prepared by using diethylene glycol diethyl ether, diethylene glycol normal hexyl ether, an anionic surfactant represented by the formula (1), i.e., SANDED END ($R^1$: alkyl group of C=12 to 15, X=3, M=Na, produced by Sanyo Chemical Industries, Ltd.), and a nonionic surfactant represented by the formula (3), i.e., RHEODOL 460 (four of alkyl groups ($R^3$ to $R^8$) are oleyl groups and remaining two are hydrogens, number of moles of ethylene oxide addition: a+b+c+d+e+f=60, produced by Kao Corporation).

TABLE 1

| Example 1 | % by weight |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): SANDED END | 0.05 |
| Nonionic surfactant represented by formula (3): RHEODOL 460 | 0.15 |
| Glycerol | 25.50 |

EXAMPLE 2

A water base ink for ink-jet recording having a composition shown in Table 2 was prepared by using diethylene glycol diethyl ether, dipropylene glycol propyl ether, an anionic surfactant represented by the formula (2), i.e., NEOPELEX G25 ($R^2$: dodecyl group, M=Na, produced by Kao Corporation), and a nonionic surfactant represented by the formula (3), i.e., RHEODOL 460. The numerical values in the table are represented by % by weight.

TABLE 2

Example 2

| | |
|---|---|
| Pure water | 40.25 |
| CAB-O-JET 300 Black (produced by Cabot) | 33.30 |
| Diethylene glycol diethyl ether | 0.20 |
| Dipropylene glycol propyl ether | 0.30 |
| Anionic surfactant represented by formula (2): NEOPELEX G25 | 0.20 |
| Nonionic surfactant represented by formula (3): RHEODOL 460 | 0.25 |
| Glycerol | 25.50 |

EXAMPLE 3

A water base ink for ink-jet recording having a composition shown in Table 3 was prepared by using tripropylene glycol normal butyl ether, diethylene glycol normal hexyl ether, an anionic surfactant represented by the formula (1), i.e., SANDED END, and a mixture of nonionic surfactants represented by the formulas (4) and (5), i.e., RHEODOL SUPER TW-0120. The numerical values in the table are represented by % by weight.

TABLE 3

Example 3

| | |
|---|---|
| Pure water | 40.45 |
| CAB-O-JET 300 Black (produced by Cabot) | 33.30 |
| Tripropylene glycol normal butyl ether | 0.40 |
| Diethylene glycol normal hexyl ether | 0.20 |
| Anionic surfactant represented by formula (1): SANDED END | 0.05 |
| Nonionic surfactant represented by formulas (4), (5): RHEODOL SUPER TW-O120 | 0.10 |
| Glycerol | 25.50 |

EXAMPLE 4

A water base ink for ink-jet recording having a composition shown in Table 4 was prepared by using diethylene glycol diethyl ether, an anionic surfactant represented by the formula (2), i.e., NEOPELEX G25, and a mixture of nonionic surfactants represented by the formulas (4) and (5) i.e., RHEODOL SUPER TW-O120. The numerical values in the table are represented by % by weight.

TABLE 4

Example 4

| | |
|---|---|
| Pure water | 40.40 |
| CAB-O-JET 300 Black (produced by Cabot) | 33.30 |
| Diethylene glycol diethyl ether | 0.50 |
| Anionic surfactant represented by formula (2): NEOPELEX G25 | 0.20 |
| Nonionic surfactant represented by formulas (4), (5): RHEODOL SUPER TW-O120 | 0.10 |
| Glycerol | 25.50 |

EXAMPLE 5

A water base ink for ink-jet recording having a composition shown in Table 5 was prepared by using diethylene glycol diethyl ether, diethylene glycol normal hexyl ether, an anionic surfactant represented by the formula (1), i.e., SANDED END, and a nonionic surfactant represented by the formula (3), i.e., RHEODOL 460. In Example 5, the water base ink for ink-jet recording was prepared by performing agitation under a condition of reduced pressure of 50 hPa for 10 minutes to remove the gas contained in the ink. The numerical values in the table are represented by % by weight.

TABLE 5

Example 5

| | |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): SANDED END | 0.05 |
| Nonionic surfactant represented by formula (3): RHEODOL 460 | 0.15 |
| Glycerol | 25.50 |

EXAMPLE 6

A water base ink for ink-jet recording having a composition shown in Table 6 was prepared by using diethylene glycol diethyl ether, diethylene glycol normal hexyl ether, an anionic surfactant represented by the formula (1), i.e., EMAL 20C ($R^1$: lauryl group, X=3, M=Na, produced by Kao Corporation), and a nonionic surfactant represented by the formula (3), i.e., RHEODOL 460.

TABLE 6

| Example 6 | % by weight |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): EMAL 20C | 0.05 |
| Nonionic surfactant represented by formula (3): RHEODOL 460 | 0.15 |
| Glycerol | 25.50 |

EXAMPLE 7

A water base ink for ink-jet recording having a composition shown in Table 7 was prepared by using diethylene glycol diethyl ether, diethylene glycol normal hexyl ether, an anionic surfactant represented by the formula (1), i.e., EMAL 20T ($R^1$: lauryl group, X=3, M=TEA, produced by Kao Corporation), and a nonionic surfactant represented by the formula (3), i.e., RHEODOL 460.

TABLE 7

| Example 7 | % by weight |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): EMAL 20T | 0.05 |
| Nonionic surfactant represented by formula (3): RHEODOL 460 | 0.15 |
| Glycerol | 25.50 |

EXAMPLE 8

A water base ink for ink-jet recording having a composition shown in Table 8 was prepared by using diethylene glycol diethyl ether, diethylene glycol normal hexyl ether, an anionic surfactant represented by the formula (1), i.e., SANDED ET ($R^1$: lauryl group, X=4, M=TEA, produced by Sanyo Chemical Industries, Ltd.), and a nonionic surfactant represented by the formula (3), i.e., RHEODOL 460.

TABLE 8

| Example 8 | % by weight |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): SANDED ET | 0.05 |
| Nonionic surfactant represented by formula (3): RHEODOL 460 | 0.15 |
| Glycerol | 25.50 |

EXAMPLE 9

A water base ink for ink-jet recording having a composition shown in Table 9 was prepared by using diethylene glycol diethyl ether, diethylene glycol normal hexyl ether, an anionic surfactant represented by the formula (1), i.e., SUNNOL LM-1130 ($R^1$: alkyl group having a number of carbon atoms of 12 to 15, X=0, M=Na, produced by Lion Corporation), and a nonionic surfactant represented by the formula (3), i.e., RHEODOL 460.

TABLE 9

| Example 9 | % by weight |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): SUNNOL LM-1130 | 0.05 |
| Nonionic surfactant represented by formula (3): RHEODOL 460 | 0.15 |
| Glycerol | 25.50 |

EXAMPLE 10

A water base ink for ink-jet recording having a composition shown in Table 10 was prepared by using diethylene glycol diethyl ether, dipropylene glycol propyl ether, an anionic surfactant represented by the formula (2), i.e., RUNOX S-100 ($R^2$: lauryl group (dodecyl group), M=Na, produced by Toho Chemical Industry Co., Ltd.), and a nonionic surfactant represented by the formula (3), i.e., RHEODOL 460.

TABLE 10

| Example 10 | % by weight |
|---|---|
| Pure water | 40.25 |
| CAB-O-JET 300 Black (produced by Cabot) | 33.30 |
| Diethylene glycol diethyl ether | 0.20 |
| Dipropylene glycol propyl ether | 0.30 |
| Anionic surfactant represented by formula (2): RUNOX 100 | 0.20 |
| Nonionic surfactant represented by formula (3): RHEODOL 460 | 0.25 |
| Glycerol | 25.50 |

EXAMPLE 11

A water base ink for ink-jet recording having a composition shown in Table 11 was prepared by using diethylene glycol diethyl ether, diethylene glycol normal hexyl ether, an anionic surfactant represented by the formula (1), i.e., SANDED END (four of $R^3$ to $R^8$ are oleyl groups and remaining two are hydrogens, a+b+c+d+e+f=40, produced by Kao Corporation), and a nonionic surfactant represented by the formula (3), i.e., RHEODOL 440.

TABLE 11

| Example 11 | % by weight |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): SANDED END | 0.05 |
| Nonionic surfactant represented by formula (3): RHEODOL 440 | 0.15 |
| Glycerol | 25.50 |

EXAMPLE 12

A water base ink for ink-jet recording having a composition shown in Table 12 was prepared by using diethylene glycol diethyl ether, diethylene glycol normal hexyl ether, an anionic surfactant represented by the formula (1), i.e., SANDED END, and a nonionic surfactant represented by the formula (3), i.e., SOLVON TR-843 (four of $R^3$ to $R^8$ are oleyl groups and remaining two are hydrogens, a+b+c+d+e+f=30, produced by Toho Chemical Industry Co., Ltd.).

TABLE 12

| Example 12 | % by weight |
|---|---|
| Pure water | 40.60 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): SANDED END | 0.05 |
| Nonionic surfactant represented by formula (3): SOLVON TR-843 | 0.15 |
| Glycerol | 25.50 |

EXAMPLE 13

A water base ink for ink-jet recording having a composition shown in Table 13 was prepared by using tripropylene glycol normal butyl ether, diethylene glycol normal hexyl ether, an anionic surfactant represented by the formula (1), i.e., SANDED END, and a mixture of nonionic surfactants represented by the formulas (4) and (5), i.e., SOLVON T-40 ($R^9$=$R^{10}$: palmityl group (C=16), l+m+n=o+p+q=20, produced by Toho Chemical Industry Co., Ltd.).

TABLE 13

| Example 13 | % by weight |
|---|---|
| Pure water | 40.45 |
| CAB-O-JET 300 Black (produced by Cabot) | 33.30 |
| Tripropylene glycol normal butyl ether | 0.40 |
| Diethylene glycol normal hexyl ether | 0.20 |
| Anionic surfactant represented by formula (1): SANDED END | 0.05 |
| Nonionic surfactants represented by formulas (4) and (5): SOLVON T-40 | 0.10 |
| Glycerol | 25.50 |

COMPARATIVE EXAMPLE 1

A water base ink for ink-jet recording having a composition shown in Table 14 was prepared by using diethylene glycol normal hexyl ether and an anionic surfactant represented by the formula (1), i.e., SANDED END. The numerical values in the table are represented by % by weight.

TABLE 14

| Comparative Example 1 | % by weight |
| --- | --- |
| Pure water | 40.50 |
| CAB-O-JET 300 Black (produced by Cabot) | 33.30 |
| Diethylene glycol normal hexyl ether | 0.30 |
| Anionic surfactant represented by formula (1): SANDED END | 0.40 |
| Glycerol | 25.50 |

COMPARATIVE EXAMPLE 2

A water base ink for ink-jet recording having a composition shown in Table 15 was prepared by using diethylene glycol diethyl ether and an anionic surfactant represented by the formula (2), i.e., NEOPELEX G25. The numerical values in the table are represented by % by weight.

TABLE 15

| Comparative Example 2 | |
| --- | --- |
| Pure water | 40.70 |
| CAB-O-JET 300 Black (produced by Cabot) | 33.30 |
| Diethylene glycol diethyl ether | 0.20 |
| Anionic surfactant represented by formula (2): NEOPELEX G25 | 0.30 |
| Glycerol | 25.50 |

COMPARATIVE EXAMPLE 3

A water base ink for ink-jet recording having a composition shown in Table 16 was prepared by using tripropylene glycol normal butyl ether and an anionic surfactant represented by the formula (1), i.e., SANDED END. The numerical values in the table are represented by % by weight.

TABLE 16

| Comparative Example 3 | |
| --- | --- |
| Pure water | 40.20 |
| CAB-O-JET 300 Black (produced by Cabot) | 33.30 |
| Tripropylene glycol normal butyl ether | 0.20 |
| Anionic surfactant represented by formula (1): SANDED END | 0.80 |
| Glycerol | 25.50 |

COMPARATIVE EXAMPLE 4

A water base ink for ink-jet recording having a composition shown in Table 17 was prepared by using diethylene glycol diethyl ether, tripropylene glycol methyl ether, and an anionic surfactant represented by the formula (1), i.e., SANDED END. The numerical values in the table are represented by % by weight.

TABLE 17

| Comparative Example 4 | |
| --- | --- |
| Pure water | 40.55 |
| CAB-O-JET 300 Black (produced by Cabot) | 33.30 |
| Diethylene glycol diethyl ether | 0.20 |
| Tripropylene glycol methyl ether | 0.40 |
| Anionic surfactant represented by formula (1): SANDED END | 0.05 |
| Glycerol | 25.50 |

COMPARATIVE EXAMPLE 5

A water base ink for ink-jet recording having a composition shown in Table 18 was prepared by using 2-pyrrolidone, dipropylene glycol propyl ether, an anionic surfactant represented by the formula (1), i.e., SANDED END, and a nonionic surfactant represented by the formula (3), i.e., RHEODOL 460. The numerical values in the table are represented by % by weight.

TABLE 18

| Comparative Example 5 | |
| --- | --- |
| Pure water | 40.40 |
| CAB-O-JET 300 Black (produced by Cabot) | 33.30 |
| 2-Pyrrolidone | 5.00 |
| Dipropylene glycol propyl ether | 0.10 |
| Anionic surfactant represented by formula (1): SANDED END | 0.20 |
| Nonionic surfactant represented by formula (3): RHEODOL 460 | 0.50 |
| Glycerol | 20.50 |

COMPARATIVE EXAMPLE 6

A water base ink for ink-jet recording having a composition shown in Table 19 was prepared by using 1,5-pentanediol, an anionic surfactant represented by the formula (1), i.e., SANDED END, and a nonionic surfactant represented by the formula (3), i.e., RHEODOL 460. The numerical values in the table are represented by % by weight.

TABLE 19

| Comparative Example 6 | |
| --- | --- |
| Pure water | 41.15 |
| CAB-O-JET 300 Black (produced by Cabot) | 33.30 |
| 1,5-Pentanediol | 5.00 |
| Anionic surfactant represented by formula (1): SANDED END | 0.03 |
| Nonionic surfactant represented by formula (3): RHEODOL 460 | 0.02 |
| Glycerol | 20.50 |

COMPARATIVE EXAMPLE 7

A water base ink for ink-jet recording having a composition shown in Table 20 was prepared by using diethylene glycol normal butyl ether and a nonionic surfactant represented by the formula (3), i.e., RHEODOL 460. The numerical values in the table are represented by % by weight.

TABLE 20

| Comparative Example 7 | |
| --- | --- |
| Pure water | 40.70 |
| CAB-O-JET 300 Black (produced by Cabot) | 33.30 |

TABLE 20-continued

| Comparative Example 7 | |
|---|---|
| Diethylene glycol normal butyl ether | 0.20 |
| Nonionic surfactant represented by formula (3): RHEODOL 460 | 0.30 |
| Glycerol | 25.50 |

COMPARATIVE EXAMPLE 8

A water base ink for ink-jet recording having a composition shown in Table 21 was prepared by using dipropylene glycol propyl ether and a nonionic surfactant represented by the formula (3), i.e., RHEODOL 460. The numerical values in the table are represented by % by weight.

TABLE 21

| Comparative Example 8 | |
|---|---|
| Pure water | 40.30 |
| CAB-O-JET 300 Black (produced by Cabot) | 33.30 |
| Dipropylene glycol propyl ether | 0.30 |
| Nonionic surfactant represented by formula (3): RHEODOL 460 | 0.60 |
| Glycerol | 25.50 |

COMPARATIVE EXAMPLE 9

A water base ink for ink-jet recording having a composition shown in Table 22 was prepared by using dipropylene glycol, diethylene glycol normal hexyl ether, and a nonionic surfactant represented by the formula (3), i.e., RHEODOL 460. The numerical values in the table are represented by % by weight.

TABLE 22

| Comparative Example 9 | |
|---|---|
| Pure water | 40.95 |
| CAB-O-JET 300 Black (produced by Cabot) | 33.30 |
| Dipropylene glycol | 3.00 |
| Diethylene glycol normal hexyl ether | 0.20 |
| Nonionic surfactant represented by formula (3): RHEODOL 460 | 0.05 |
| Glycerol | 22.50 |

COMPARATIVE EXAMPLE 10

A water base ink for ink-jet recording having a composition shown in Table 23 was prepared by using diethylene glycol diethyl ether, diethylene glycol normal hexyl ether, and a nonionic surfactant represented by the formulas (4), (5), i.e., RHEODOL SUPER TW-O120. The numerical values in the table are represented by % by weight.

TABLE 23

| Comparative Example 10 | % by weight |
|---|---|
| Pure water | 40.40 |
| CAB-O-JET 300 Black (produced by Cabot) | 33.30 |
| Diethylene glycol diethyl ether | 0.20 |
| Diethylene glycol normal hexyl ether | 0.20 |
| Nonionic surfactant represented by formulas (4), (5): RHEODOL SUPER TW-O120 | 0.40 |
| Glycerol | 25.50 |

COMPARATIVE EXAMPLE 11

A water base ink for ink-jet recording having a composition shown in Table 24 was prepared by using triethylene glycol normal butyl ether and a nonionic surfactant represented by the formulas (4), (5), i.e., RHEODOL SUPER TW-O120. The numerical values in the table are represented by % by weight.

TABLE 24

| Comparative Example 11 | |
|---|---|
| Pure water | 40.00 |
| CAB-O-JET 300 Black (produced by Cabot) | 33.30 |
| Triethylene glycol normal butyl ether | 0.20 |
| Nonionic surfactant represented by formulas (4), (5): RHEODOL SUPER TW-O120 | 1.00 |
| Glycerol | 25.50 |

COMPARATIVE EXAMPLE 12

A water base ink for ink-jet recording having a composition shown in Table 25 was prepared by using diethylene glycol diethyl ether and a nonionic surfactant represented by the formulas (4), (5), i.e., RHEODOL SUPER TW-O120. The numerical values in the table are represented by % by weight.

TABLE 25

| Comparative Example 12 | |
|---|---|
| Pure water | 40.95 |
| CAB-O-JET 300 Black (produced by Cabot) | 33.30 |
| Diethylene glycol diethyl ether | 0.20 |
| Nonionic surfactant represented by formulas (4), (5): RHEODOL SUPER TW-O120 | 0.05 |
| Glycerol | 25.50 |

COMPARATIVE EXAMPLE 13

A water base ink for ink-jet recording having a composition shown in Table 26 was prepared by using tripropylene glycol normal butyl ether, diethylene glycol normal hexyl ether, an anionic surfactant represented by the formula (1), i.e., SANDED END, and an anionic surfactant represented by the formula (2), i.e., NEOPELEX G25. The numerical values in the table are represented by % by weight.

TABLE 26

| Comparative Example 13 | |
|---|---|
| Pure water | 40.60 |
| CAB-O-JET 300 Black (produced by Cabot) | 33.30 |
| Tripropylene glycol normal butyl ether | 0.10 |
| Diethylene glycol normal hexyl ether | 0.20 |
| Anionic surfactant represented by formula (1): SANDED END | 0.10 |
| Anionic surfactant represented by formula (2): NEOPELEX G25 | 0.20 |
| Glycerol | 25.50 |

COMPARATIVE EXAMPLE 14

A water base ink for ink-jet recording having a composition shown in Table 27 was prepared by using dipropylene glycol, an anionic surfactant represented by the following formula (6), i.e., BEAULIGHT LSS (disodium polyoxyethylene alkylsulfosuccinate) (produced by Sanyo Chemical Industries, Ltd.), and a nonionic surfactant represented by the formula (3), i.e., RHEODOL 460. The numerical values in the table are represented by % by weight.

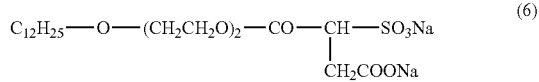

TABLE 27

| Comparative Example 14 | |
|---|---|
| Pure water | 40.90 |
| CAB-O-JET 300 Black (produced by Cabot) | 33.30 |
| Dipropylene glycol | 5.00 |
| Surfactant represented by formula (6): BEAULIGHT LSS | 0.20 |
| Nonionic surfactant represented by formula (3): RHEODOL 460 | 0.10 |
| Glycerol | 20.50 |

COMPARATIVE EXAMPLE 15

A water base ink for ink-jet recording having a composition shown in Table 28 was prepared by using diethylene glycol normal hexyl ether, an anionic surfactant represented by the following formula (7), i.e., PHOSPHANOL RS710 (polyoxyethylene alkylphosphate) (produced by Toho Chemical Industry Co., Ltd.), and a nonionic surfactant represented by the formula (3), i.e., RHEODOL 460. The numerical values in the table are represented by % by weight.

$$C_yH_{(2y+1)}-O-(CH_2CH_2O)_9-PO_3H \quad (7)$$

TABLE 28

| Comparative Example 15 | |
|---|---|
| Pure water | 40.40 |
| CAB-O-JET 300 Black (produced by Cabot) | 33.30 |
| Diethylene glycol normal hexyl ether | 0.40 |
| Surfactant represented by formula (7): PHOSPHANOL RS710 | 0.10 |
| Nonionic surfactant represented by formula (3): RHEODOL 460 | 0.30 |
| Glycerol | 25.50 |

COMPARATIVE EXAMPLE 16

A water base ink for ink-jet recording having a composition shown in Table 29 was prepared by using 1,5-pentanediol, an anionic surfactant represented by the formula (1), i.e., SANDED END, and a nonionic surfactant represented by the following formula (8), i.e., Naloacty N100 (polyoxyalkylene alkyl ether, z=14 to 15, and a part of $(CH_2CH_2O)$ is $(CH_2CH_2CH_2O)$). The numerical values in the table are represented by % by weight.

$$C_zH_{(2z+1)}-O-(CH_2CH_2O)_{10}H \quad (8)$$

TABLE 29

| Comparative Example 16 | |
|---|---|
| Pure water | 40.95 |
| CAB-O-JET 300 Black (produced by Cabot) | 33.30 |
| 1,5-Pentanediol | 5.00 |
| Anionic surfactant represented by formula (1): SANDED END | 0.05 |

TABLE 29-continued

| Comparative Example 16 | |
|---|---|
| Nonionic surfactant represented by formula (8): Naloacty N100 | 0.20 |
| Glycerol | 20.50 |

COMPARATIVE EXAMPLE 17

A water base ink for ink-jet recording having a composition shown in Table 30 was prepared by using dipropylene glycol propyl ether, an anionic surfactant represented by the formula (1), i.e., SANDED END, and a nonionic surfactant represented by the following formula (9), i.e., Aromox DMC-W (alkylamine oxide, k=12 to 15). The numerical values in the table are represented by % by weight.

$$C_kH_{(2k+1)}-N(CH_3)_2O \quad (9)$$

TABLE 30

| Comparative Example 17 | |
|---|---|
| Pure water | 40.50 |
| CAB-O-JET 300 Black (produced by Cabot) | 33.30 |
| Dipropylene glycol propyl ether | 0.40 |
| Anionic surfactant represented by formula (1): SANDED END | 0.20 |
| Nonionic surfactant represented by formula (9): Aromox DMC-W | 0.10 |
| Glycerol | 25.50 |

COMPARATIVE EXAMPLE 18

A water base ink for ink-jet recording having a composition shown in Table 31 was prepared by using diethylene glycol diethyl ether, diethylene glycol diethyl normal hexyl ether, an anionic surfactant represented by the formula (1), i.e., SANDED END, and a nonionic surfactant represented by the formula (3), i.e., RHEODOL 460. In Comparative Example 18, the water base ink for ink-jet recording was prepared by performing agitation under a condition of reduced pressure of 50 hPa for 10 minutes to remove the gas contained in the ink. The numerical values in the table are represented by % by weight.

TABLE 31

| Comparative Example 18 | |
|---|---|
| Pure water | 40.75 |
| CAB-O-JET 300 Black (produced by Cabot) | 33.30 |
| Diethylene glycol diethyl ether | 0.20 |
| Diethylene glycol normal hexyl ether | 0.20 |
| Anionic surfactant represented by formula (1): SANDED END | 0.03 |
| Nonionic surfactant represented by formula (3): RHEODOL 460 | 0.02 |
| Glycerol | 25.50 |

Evaluation

The water base inks for ink-jet recording prepared in Examples 1 to 13 and Comparative Example 1 to 18 were evaluated in accordance with the following methods for the amount of dissolved oxygen, the contact angle with respect to epoxy resin, the ink discharge performance, the feathering evaluation, and the overall evaluation of the ink. Obtained results are shown in Table 32.

(1) Amount of Dissolved Oxygen

The amount of dissolved oxygen contained in the prepared water base ink for ink-jet recording was measured by using a dissolved oxygen meter (OM-12 produced by HORIBA, Ltd.).

(2) Contact Angle with Epoxy Resin

The contact angle of the prepared water base ink for ink-jet recording with respect to the surface of epoxy resin was measured by using a contact angle meter (CA-X produced by Kyowa Interface Science Co., Ltd.). The reason why the contact angle with respect to epoxy resin is performed is as follows. That is, any epoxy resin is used to adhere a member for constructing an ink flow passage, for example, in an ink-jet head described in Japanese Patent Application Laid-open No. 2002-225286. The epoxy resin is exposed to the interior of the ink flow passage. Therefore, the contact angle between the ink and the epoxy resin exhibits the wettability in the ink flow passage.

(3) Ink Discharge Performance

An ink cartridge, which had been used once, was removed from a printer main body. The ink cartridge was installed again so that bubbles were forcibly allowed to appear. After that, the purge operation (suction of the ink with a pump of the printer main body) was performed three times. The evaluation was directed to the ratio of the number of discharge failure nozzles with respect to the number of all nozzles. As for the commercial product, the ratio of discharge failure nozzles must be substantially 0%. However, in this test, the bubbles were forcibly introduced unlike the normal operation. Therefore, the case, in which the ratio of discharge failure nozzles was not more than 1%, was regarded to be "+". The evaluation criteria are as follows. ++: The ratio of discharge failure nozzles was not more than 0.1% after the purge operation performed three times. +: The ratio of discharge failure nozzles was not more than 1% after the purge operation performed three times. ±: The ratio of discharge failure nozzles was not more than 3% after the purge operation performed three times. −: The ratio of discharge failure nozzles was more than 3% after the purge operation performed three times.

(4) Evaluation of Feathering

An image sample was recorded to evaluate whether or not the feathering occurred. The image sample was composed of a portion comprising single color letters without any background, and straight lines of 0.75 point. The evaluation was directed to the distinction of the letters and the disturbance of the lines caused by the blurring of the ink. As for the size of the recorded letters, the letter size was set to 11 point with Microsoft Word 97. The recording was performed by using regular paper (Xerox 4200). The evaluation criteria are as follows. +: The feathering was scarcely caused for the straight lines and the text, and the letters were vivid. ±: The feathering was slightly caused on the straight lines, but the letters were sufficiently distinguishable. −: The feathering was clearly caused on the straight lines, and the letters were indistinct as well.

The image sample was recorded by using an ink-jet printer having an on-demand type multi-head (discharge orifice diameter: 35 μm, resistance value of heating resistor: 150 Ω, driving voltage: 30 V, frequency: 2 kHz) to perform the recording with the water base ink for ink-jet recording by discharging liquid droplets by applying the thermal energy to the ink contained in the recording head, and an ink-jet printer having an on-demand type multi-head (discharge orifice diameter: 40 μm, driving voltage: 30 V, frequency: 10 kHz) to perform the recording by generating liquid droplets by applying the pressure brought about by the piezoelectric element vibration to the ink contained in the recording head.

(5) Overall Evaluation

The worst evaluation of the ink discharge performance evaluation and the feathering evaluation was regarded as the overall evaluation of the ink. For example, when the evaluation of the ink discharge performance was "−", and the evaluation of the feathering was "++", then the overall evaluation was "−", because the discharge performance was extremely unsatisfactory even when the printing quality was extremely satisfactory.

TABLE 32

| | Ink discharge performance | Feathering | Overall evaluation | Amount of dissolved oxygen (mg/L) | Contact angle with epoxy resin (°) |
|---|---|---|---|---|---|
| Example 1 | ++ | + | + | 5.5 | 41 |
| Example 2 | ++ | + | + | 5.1 | 38 |
| Example 3 | ++ | + | + | 6.0 | 48 |
| Example 4 | + | + | + | 5.5 | 42 |
| Example 5 | ++ | + | + | 1.9 | 41 |
| Example 6 | ++ | + | + | 5.8 | 42 |
| Example 7 | ++ | + | + | 5.1 | 40 |
| Example 8 | ++ | + | + | 5.5 | 41 |
| Example 9 | ++ | + | + | 5.6 | 41 |
| Example 10 | ++ | + | + | 5.1 | 39 |
| Example 11 | ++ | + | + | 5.8 | 48 |
| Example 12 | ++ | + | + | 5.9 | 49 |
| Example 13 | ++ | + | + | 5.2 | 40 |
| Comp. Ex. 1 | ++ | − | − | 5.2 | 37 |
| Comp. Ex. 2 | ++ | − | − | 5.6 | 38 |
| Comp. Ex. 3 | ++ | − | − | 6.1 | 31 |
| Comp. Ex. 4 | − | + | − | 6.0 | 52 |
| Comp. Ex. 5 | ++ | − | − | 5.9 | 32 |
| Comp. Ex. 6 | − | + | − | 5.3 | 50 |
| Comp. Ex. 7 | − | + | − | 5.4 | 43 |
| Comp. Ex. 8 | − | − | − | 5.6 | 34 |
| Comp. Ex. 9 | − | + | − | 5.9 | 58 |
| Comp. Ex. 10 | − | + | − | 5.2 | 46 |
| Comp. Ex. 11 | − | − | − | 5.6 | 33 |
| Comp. Ex. 12 | − | + | − | 5.4 | 58 |
| Comp. Ex. 13 | ++ | − | − | 6.0 | 38 |
| Comp. Ex. 14 | − | − | − | 6.1 | 48 |
| Comp. Ex. 15 | − | − | − | 5.8 | 49 |
| Comp. Ex. 16 | ± | ± | ± | 5.6 | 38 |
| Comp. Ex. 17 | − | ± | − | 6.0 | 37 |
| Comp. Ex. 18 | ++ | + | + | 2.0 | 50 |

As shown in Table 32, in Examples 1 to 13, the inks, which had the satisfactory ink discharge performance, which provided the sharp contour of the image portion, and which brought about the high printing quality, were successfully obtained. On the other hand, in Comparative Examples 1 to 17, the ink discharge performance was unsatisfactory in some cases, and the feathering clearly appeared and any sufficient printing quality was unsuccessfully obtained in other cases, in which no satisfactory result was obtained. According to these results, the following fact has been successfully confirmed. That is, the obtained effect is small even when each of the anionic surfactant represented by the formula (1) or the formula (2) and the nonionic surfactant or surfactants represented by the formula (3), the formula (4), and/or the formula (5) is used singly. However, when the anionic surfactant represented by the formula (1) or the formula (2) and the nonionic surfactant represented by the formula (3) or the mixture of the nonionic surfactants represented by the formula (4) and the formula (5) are used in combination, the ink is obtained, in which the feathering is not caused and the ink discharge performance is satisfactory at the recording head even under the condition in which the amount of dissolved oxygen is not less than 5 mg/L.

As for the inks of Comparative Examples 6 and 18 in which the types and the contents of the anionic surfactant and the nonionic surfactant are exactly identical, the ink discharge performance was "++" in the ink of the Comparative Example 18 in which the amount of dissolved oxygen was less than 5 mg/L, while the ink discharge performance was "−" in the ink of the Comparative Example 6 in which the amount of dissolved oxygen was not less than 5 mg/L. This result indicates the fact that the ink discharge performance may be highly possibly "−" when the ink of Comparative Example 18 is stored for a long term. It is indicated that the long term stability of the ink cannot be discussed when the measurement is performed under the condition in which the amount of dissolved oxygen is less than 5 mg/L. On the contrary, in the inks of Examples 1 and 5, the discharge performance was "++" irrelevant to the amount of dissolved oxygen. Therefore, it is appreciated that the stable discharge performance is obtained even when the ink is stored for a long term. It is noted that the present invention is not limited to Examples. The present invention can be carried out even when the material substances to be used, the amounts thereof, and the manufacturing conditions are changed within the ranges described above.

The present invention is constructed as described above. Therefore, it is possible to provide the water base ink for ink-jet recording which makes it possible to perform the normal printing without causing any ink discharge failure by the contamination with bubbles over a long term, which causes no feathering even when the recording is performed on the regular paper, and which makes it possible to record a high quality image and the like.

What is claimed is:

1. A water base ink for ink-jet recording comprising:

water;

self-dispersing type carbon black;

at least one anionic surfactant which is selected from a surfactant represented by the following formula (1) and a surfactant represented by the following formula (2); and at least one nonionic surfactant which is selected from a surfactant represented by the following formula (3) and a mixture of a surfactant represented by the following formula (4) and a surfactant represented by the following formula (5):

$$R^1-O(CH_2CH_2O)_x-SO_3M \quad (1)$$

wherein $R^1$ represents an alkyl group having carbon atoms of a number of 12 to 15, X is 0 to 4, and M represents Na or organic amine in the formula (1);

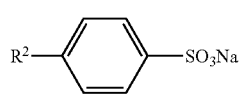
(2)

wherein $R^2$ represents an alkyl group having carbon atoms of a number of 12 in the formula (2);

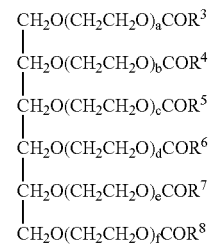
(3)

wherein each of $R^3$ to $R^8$ represents hydrogen or an alkyl group of C=18, and a+b+c+d+e+f represents an integer of 30 to 80 in the formula (3);

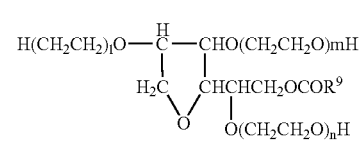
(4)

wherein $R^9$ represents an alkyl group having carbon atoms of a number of 16 to 18, and l+m+n=10 to 30 is satisfied in the formula (4);

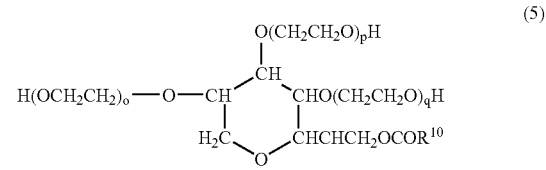
(5)

wherein $R^{10}$ represents an alkyl group having carbon atoms of a number of 16 to 18, and o+p+q=10 to 30 is satisfied in the formula (5).

2. The water base ink for ink-jet recording according to claim 1, wherein a content of the anionic surfactant and the nonionic surfactant in total is 0.1 to 0.5% by weight.

3. The water base ink for ink-jet recording according to claim 1, wherein the anionic surfactant is the surfactant represented by the formula (1), and the organic amine is triethanolamine.

4. The water base ink for ink-jet recording according to claim 1, wherein the anionic surfactant is the surfactant represented by the formula (1), $R^1$ is lauryl group, and X equals 3.

5. The water base ink for ink-jet recording according to claim 1, wherein the anionic surfactant is the surfactant represented by the formula (1), $R^1$ is lauryl group, X equals 4, and M is triethanolamine.

6. The water base ink for ink-jet recording according to claim 1, wherein the anionic surfactant is the surfactant represented by the formula (1), $R^1$ is the alkyl group having carbon atoms of the number of 12 to 15, X equals 0, and M is Na.

7. The water base ink for ink-jet recording according to claim 1, wherein the nonionic surfactant is the surfactant represented by the formula (3), and a+b+c+d+e+f equals 30, 40, or 60.

8. The water base ink for ink-jet recording according to claim 7, wherein the nonionic surfactant is the surfactant represented by the formula (3), at least four of $R^3$ to $R^8$ are alkyl groups of C=18, and the remaining two are hydrogens.

9. The water base ink for ink-jet recording according to claim 1, wherein the nonionic surfactant is the mixture of the surfactants represented by the formulas (4) and (5), a mixing ratio of the surfactant represented by the formula (4) and the surfactant represented by the formula (5) is 1:3, and $R^9$ equals $R^{10}$.

10. The water base ink for ink-jet recording according to claim 9, wherein $R^9$ and $R^{10}$ are oleyl groups respectively.

11. The water base ink for ink-jet recording according to claim 9, wherein $R^9$ and $R^{10}$ are palmityl groups respectively.

12. The water base ink for ink-jet recording according to claim 9, wherein l+m+n equals o+p+q.

13. The water base ink for ink-jet recording according to claim 12, wherein l+m+n equals o+p+q equals 20.

14. The water base ink for ink-jet recording according to claim 1, wherein a content ratio of anionic surfactant: nonionic surfactant is 1:3 to 3:1.

15. An ink cartridge comprising the water base ink for ink-jet recording as defined in claim 1.

* * * * *